United States Patent
He et al.

(10) Patent No.: US 6,214,892 B1
(45) Date of Patent: Apr. 10, 2001

(54) POLYCARBONATE ISOLATION THROUGH HOMOGENIZATION DEVOLATIZATION

(75) Inventors: Qiwei He, Niskayuna; Paul Russell Wilson, Latham; Paul William Buckley, Scotia, all of NY (US); Allen Wai Yee Ko, Evansville, IN (US); Larry Allen Divins, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/470,735

(22) Filed: Dec. 23, 1999

(51) Int. Cl.⁷ ................................. C08J 11/04; C08J 6/00
(52) U.S. Cl. .............................. 521/40; 521/48; 523/346; 523/347; 528/491; 528/501; 528/502
(58) Field of Search ..................... 521/40, 48; 523/346, 523/347; 528/491, 501, 502

(56) References Cited

U.S. PATENT DOCUMENTS

| | | | |
|---|---|---|---|
| 4,546,172 | 10/1985 | Kohyama et al. | 528/491 |
| 5,583,166 | 12/1996 | Okamoto et al. | 523/340 |
| 5,663,277 | 9/1997 | Isshiki et al. | 528/196 |

*Primary Examiner*—Morton Foelak
(74) *Attorney, Agent, or Firm*—Robert T. Barker; Noreen C. Johnson

(57) ABSTRACT

This invention relates to a method of recovering a polymer from an organic mixture comprising polymer and an organic solvent, the method comprising:

a) admixing an aqueous solution and the organic mixture by the application of a combined mechanical and hydraulic shear force, the combined mechanical and shear force being sufficient to form a liquid-liquid dispersion;

b) removing the organic solvent from the liquid-liquid dispersion thereby forming a remaining solution; and c) separating the polymer from the remaining solution.

In one embodiment the polymer is a polycarbonate prepared by the interfacial method, and the organic solvent is methylene chloride.

27 Claims, 1 Drawing Sheet

POLYCARBONATE ISOLATION THROUGH HOMOGENIZATION DEVOLATIZATION

FIELD OF THE INVENTION

This invention relates to a method for recovering polymer resins from solution. More particularly, it relates to a process for isolating a polymer resin from a liquid-liquid dispersion that is formed by admixing an aqueous solution with an organic solvent that contains the dissolved polymer.

BACKGROUND OF THE INVENTION

Several methods are currently used to recover polymer resins from solution. Some of the methods are energy intensive and require large quantities of steam to accomplish removal of the solvent. Other methods require high viscosity process equipment which require a high investment cost. Further, the residual solvent contained in the product powder or particles is difficult to remove.

U.S. Pat. No. 456,172 discloses the production of polycarbonate resin particles having high bulk density that are produced by a process in which a polymer solution or polymer solution and water mixture are fed into an agitation tank filled into a water bath having a temperature higher than the boiling point of methylene chloride. The polycarbonate is recovered in the form of an aqueous slurry.

This process has the disadvantage that the polycarbonate often agglomerates, producing a large sticky mass prior to precipitation, leading to difficulties in processing. In this process, an off-tank wet pulverizer was used to ground the large sticky mass. In some cases, non-solvents are used to overcome this problem. The utilization of high viscosity process equipment is another solution to the problem of agglomeration.

It would be desirable to develop a process for the recovery of polymers in solution which avoids the use of high shear agitation in the tank, large quantities of anti-solvent and/or water, large expeditures of energy, and special equipment.

BRIEF SUMMARY OF THE INVENTION

Figure 1:
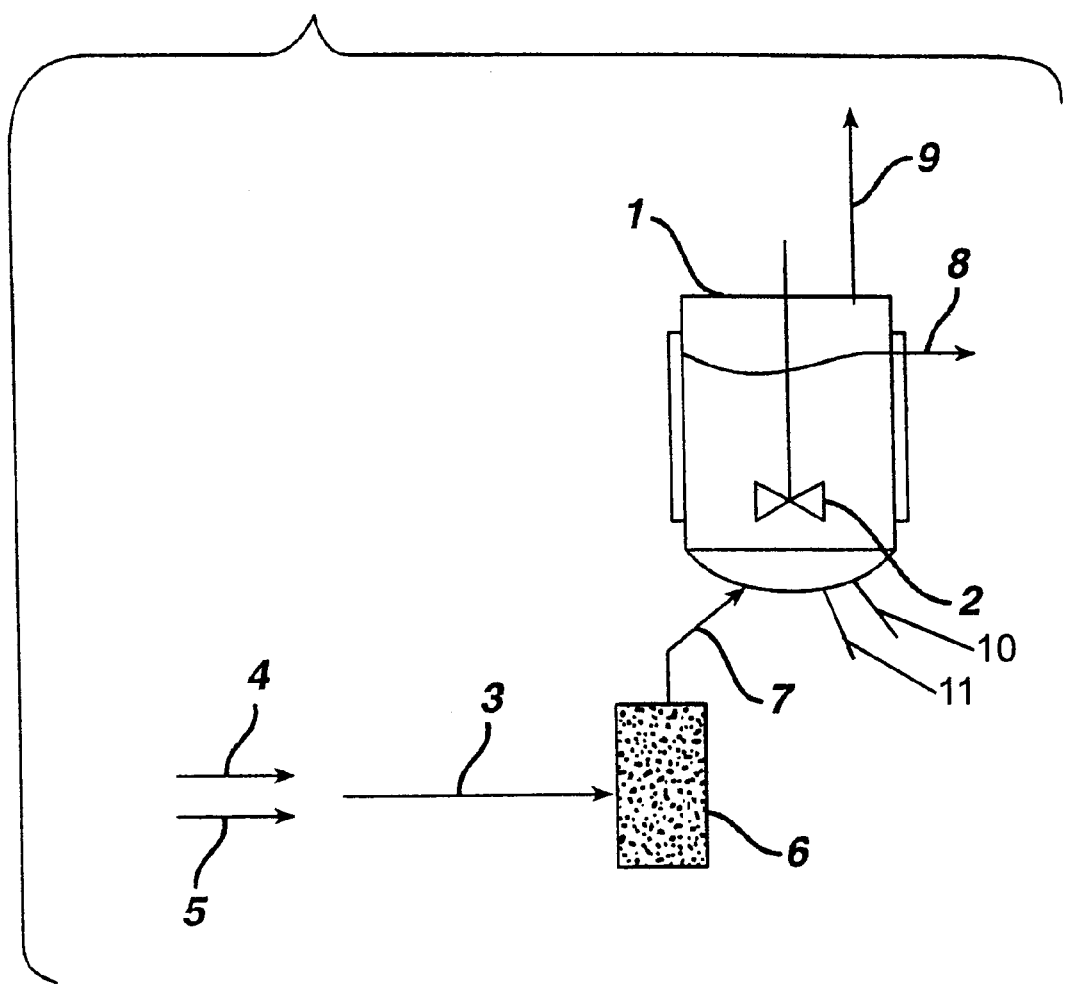
FIG. 1 sets forth a diagram of one embodiment of the process.

In one aspect the invention relates to a method of recovering polymer from an organic mixture comprising polymer and an organic solvent, the method comprising:
a) admixing an aqueous solution and the organic mixture by application of a combined mechanical and hydraulic shear force, the combined mechanical and hydraulic shear force being sufficient to form a liquid-liquid dispersion;
b) removing the organic solvent from the liquid-liquid dispersion thereby forming a remaining solution and
c) separating the polycarbonate from the remaining solution.

DESCRIPTION OF THE INVENTION

The present invention addresses these concerns and provided further surprising properties.

The present invention may be understood more readily by reference to the following detailed description of preferred embodiments of the invention and the examples included therein.

Before the present compositions of matter and methods are disclosed and described, it is to be understood that this invention is not limited to specific synthetic methods or to particular formulations, as such may, of course, vary. It is also to be understood that the terminology used herein is for the purpose of describing particular embodiments only and is not intended to be limiting.

In the following specification, reference will be made to a number of terms which shall be defined to have the following meanings:

The singular forms "a", "an" and "the" include plural referents unless the context clearly dictates otherwise.

"Optional" or "optionally" means that the subsequently described event or circumstance may or may not occur, and that the description includes instances where the event occurs and instances where it does not.

As used herein, the term "interfacial polycarbonate" refers to a polycarbonate made by the interfacial reaction of a dihydric phenol and a carbonate precursor.

"BPA" is herein defined as bisphenol A or 2,2-bis(4-hydroxyphenyl)propane.

The terms "diphenol" and "dihydric phenol" as used herein are synonymous.

The term "polymer resin" as used herein included, but is not limited to oligomers, graft polymers, block copolymers, terpolymers, branched polymers, thermoplastic blends and mixtures thereof. Suitable thermoplastics for treatment in the instant process include, but are not limited to, polycarbonates, polystyrene, polyethylene ether, polyphenylene ethers, polyetherimides, and polyester.

In one embodiment of the invention, polycarbonates are isolated from a solution comprising the polycarbonate and an organic solvent, the polycarbonate produced during the interfacial process, where the organic solvent acts as the reaction medium during the interfacial process.

Polycarbonates which may be isolated by the method of this invention typically comprise structural units of the formula

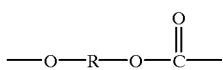

III wherein at least about 60% of the total number of R groups are aromatic organic radicals and the balance thereof are aliphatic, alicyclic or aromatic radicals. Preferably, each R is an aromatic organic radical and more preferably a radical of the formula

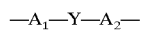

IV wherein each $A_1$ and $A_2$ is a is a monocyclic divalent aryl radical and Y is a bridging radical in which one or two carbonate atoms separate $A_1$ and $A_2$. Such radicals may be derived from dihydroxyaromatic compounds of the formulas OH—R—OH and OH—$A_1$—Y—$A_2$—OH, or their corresponding derivatives. $A_1$ and $A_2$ include but are not limited to unsubstituted phenylene, preferably p-phenylene or substituted derivatives thereof. The bridging radical Y is most often a hydrocarbon group and preferably a saturated group, such as methylene, cyclohexylidene or isopropylidene. Isopropylidene is the more preferred. Thus, the more preferred polycarbonates are those comprising residues of 2,2-bis(4-hydroxyphenyl)propane, also known as "bisphenol A". In one embodiment, the polycarbonate is a homopolymer of bisphenol A.

(Co)polyestercarbonates may also be isolated by the method of this invention. The polyestercarbonate may comprise residues of aliphatic or aromatic diacids. The corresponding derivatives of aliphatic or aromatic diacids, such as the corresponding dichlorides, may also be utilized in the polymerization.

Suitable organic solvents for use in the interfacial process for polycarbonate synthesis include any organic solvent which is substantially insoluble in water and inert to the process conditions. The organic solvent should also be a liquid under the reaction conditions and should not react with the carbonyl halide, or the caustic. Suitable organic solvents include, but are not limited to, aliphatic hydrocarbons such as pentane, hexane, cyclohexane, and heptane; aromatic hydrocarbons such as toluene, xylene; substituted aromatic hydrocarbons, such as chlorobenzene, dichlorobenzene, and nitrobenezene; chlorinated aliphatic hydrocarbons such as chloroform and methylene chloride, and mixtures of any of the aforementioned solvents. The aforementioned solvents may also be mixed with ethers, including but not limited to tetrahydrofuran. Chlorinated aliphatic hydrocarbons are preferred, in particular methylene chloride.

Suitable dihydric phenols utilized in the preparation of polycarbonate, include, but are not limited to, BPA; 2,2-bis (3,5-dibromo-4-hydroxyphenyl)propane; 2,2-bis(3,5-dimethyl-4-hydroxyphenyl)propane; 1,1-bis(4-hydroxyphenyl)cyclohexane; 1,1-bis(3,5-dimethyl-4-hydroxyphenyl)cyclohexane; 1,1-bis(4-hydroxyphenyl) decane; 1,1-bis(4-hydroxyphenyl)propane; 1,1-bis(4-hydroxyphenyl)cyclododecane; 1,1-bis(3,5-dimethyl-4-hydroxyphenyl)cyclododecane; 4,4-dihydroxyphenyl ether; 4,4-thiodiphenol; 4,4-dihydroxy-3,3-dichlorodiphenyl ether; 4,4-thiodiphenol; 4,4-dihydroxy-3,3-dichlorodiphenyl ether; 4,4-dihydroxy-2,5-dihydroxydiphenyl ether; BPI; 1,1-bis(4-hydroxyphenyl)-1-phenylethane; 1,1-bis (3-methyl-4-hydroxyphenyl)-1-phenylethane, and mixtures thereof. In one embodiment, the residues of dihydric phenol in the polycarbonate comprise 100 mol % of residues derived from BPA.

Optionally, polyfunctional compounds may be utilized in the preparation of polycarbonate by an interfacial process. Suitable polyfunctional compounds used in the polymerization of branched polycarbonate include, but are not limited to, 1,1,1-tris(4-hydroxyphenyl)ethane, 4-[4-[1,1-bis(4-hydroxyphenyl)-ethyl]-dimethylbennzyl], trimellitic anhydride, trimellitic acid, or their acid chloride derivatives.

In preparing a polycarbonate, an endcapping agent may optionally be used. Suitable endcapping agents include monovalent aromatic hydroxy compounds, haloformate derivatives of monovalent aromatic hydroxy compounds, monovalent carboxylic acids, halide derivatives of monovalent carboxylic acids, and mixtures thereof.

Suitable endcapping agents include, but are not limited to phenol, p-tert-butylphenol; p-cumylphenol; p-cumylphenolcarbonate; undecanoic acid, lauric acid, stearic acid; phenyl chloroformate, t-butyl phenyl chloroformate, p-cumyl chloroformate, chroman chloroformate, octyl phenyl; nonyl phenyl chloroformate or a mixture thereof.

If present during the interfacial synthesis, the endcapping agent is preferably present in amounts of about 0.01 to about 0.20 moles, preferably about 0.02 to about 0.15 moles, even more preferably about 0.02 to about 0.10 moles per 1 mole of the dihydric phenol.

The reaction to produce the polycarbonate can be conducted as a batch or a continuous process. Any desired apparatus can be used for the reaction. The material and the structure of the reactor used in the present invention is not particularly limited as long as the reactor has an ordinary capability of stirring. It is preferable that the reactor is capable of stirring in high viscosity conditions as the viscosity of the reaction system is increased in later stages of the reaction.

The interfacial process for preparing polycarbonate results in a product mixture comprising the product polymer dissolved in the reaction media, which comprises an organic solvent, as mentioned. Typical organic solvents utilized in interfacial polymerizations, as mentioned previously, include, but are not limited to aliphatic hydrocarbons such as pentane, hexane, cyclohexane, and heptane; aromatic hydrocarbons such as toluene, xylene; substituted aromatic hydrocarbons, such as chlorobenzene, dichlorobenzene, and nitrobenezene; chlorinated aliphatic hydrocarbons such as chloroform and methylene chloride, and mixtures of any of the aforementioned solvents. The aforementioned solvents may also be mixed with ethers, including but not limited to tetrahydrofuran. Chlorinated aliphatic hydrocarbons are preferred in interfacial polycarbonate preparation, in particular methylene chloride. Typically, the product mixture comprises from about 5 to about 25% by weight of the product polymer, for instance polycarbonate. In one embodiment of the process, the organic solvent is methylene chloride and the polycarbonates recovered are BPA homopolycarbonates and copolymers prepared therefrom.

Prior to further treatment according to the process of the present invention the product should be purified. The product mixture may be purified by, for example, a series of washing steps to remove impurities such as salts, catalysts, water and unreacted monomer. In the case of BPA polycarbonate, for instance, it is preferable that the product mixture contain less than about 1 part per million (ppm) chloride, less than about 100 ppm BPA monomer, and less than about 4 ppm residual catalyst.

In the instant process, the product mixture, obtained from an interfacial polycarbonate synthesis, for instance, is admixed with an aqueous solution. The aqueous solution that is admixed with the product mixture from an interfacial polycarbonate synthesis preferably comprises from about 90 to about 100% by weight of water, preferably about 95 to about 100% by weight water, even more preferably about 100% by weight of water. By "admixing" it is meant that the aqueous solution and the product mixture are brought into contact under a shear force, in particular a combined mechanical and hydraulic shear force.

The resultant admixture is a two phase mixture, having an aqueous phase and an organic phase. The ratio of water to organic solvent, by volume, in the admixture is in the range of about 15:1 to 1:1, more preferably 5:1, even more preferably 1:1. Effort should be made to avoid any phase contact between water and organic solution before the shear force is applied to the mixture, to avoid the potential nonuniformity of the droplet generated.

In the present invention, the shearing force is sufficient to form a liquid-liquid dispersion having a continuous phase and a dispersed phase. The shearing force is a combined mechanical and hydraulic shear force. The dispersed phase comprises droplets of the organic solvent, containing the dissolved polymer, suspended in the continuous phase. The continuous phase comprises the aqueous solution. The process of the present invention does not require emulsifying agents, however emulsifying agents may optionally be added. The addition of emulsifying agents usually necessitates further purification steps in the product polyearbonate.

The means of applying the combined mechanical and hydraulic shear force, for example a rotor-stator in-line mixer, is preferably operated at a shear rate such that the admixture forms a solution with droplets having a diameter of from about 1 to about 300 microns, preferably from about 1 to about 100 microns, even more preferably from about 1 to about 50 microns. The droplets are suspended in the continuous aqueous phase.

The combined mechanical and hydraulic shear force may be applied by means, including, but not limited to, rotor stator shear mixers, both single or multistage; a low profile rotor stator shear mixer; a colloid mill; and a high pressure homogenizer. The shear force applied is a combination of mechanical shear force and hydraulic shear force. In one embodiment, a rotor stator in-line mixer is used to apply shear force to the admixture. "Shear force" as used herein refers to the combined mechanical and hydraulic shear force. One example of a suitable rotor stator shear mixer is a single stage rotor shear mixer, Model 150L, manufactured by SILVERSON MACHINES of East Longmeadow, Mass. Suitable shear rates in the mixer are from about $5\times10^4$/second to about $7\times10^5$/second; more preferably about $5\times10^4$/second to about $3\times10^5$/second.

As mentioned, to provide better control of the solution droplets formed, it is preferable that the aqueous solution stream and the product mixture stream do not make contact before they are subject to a shear force, for example, before the water and organic streams reach the center of a stator in a rotor stator mixer. In one embodiment, this is achieved by introducing both streams using an annuli. The two streams are intimately mixed by the applied force. By "intimately mixed" it is meant that the mixture is prepared with sufficient mechanical shear and hydraulic shear force to produce a dispersed phase, which is finely divided and homogeneously dispersed in the continuous phase.

The liquid-liquid dispersion having the aforementioned characteristics provides better drying characteristics than known high shear isolation methods. The droplets with smaller diameter formed in the liquid-liquid dispersion have higher surface to volume ratios, therefore the evaporation of the solvent and drying of the particles can proceed at a faster rate. This in turn reduces the particle residence time in the agitation tank and reduces the chance of agglomeration.

Following formation of the liquid-liquid dispersion, removal of the organic solvent from the liquid-liquid dispersion is effected. The organic solvent may be removed by various means, including, for example, introduction of the liquid-liquid dispersion into a vessel filled with water. During this stage, it is preferable to provide agitation sufficient to provide enough turbulence, and therefore heat transfer, for the organic solvent evaporation. It is preferable that at least about 80% by weight, more preferably 95% by weight, of the organic solvent be removed in this step. The organic solvent in the remaining solid is preferably no more than from about 0.5 to about 10%, by weight of the polymer resin being isolated. The vapors from the organic solvent that are recovered in this step may optionally be condensed and recovered for other uses. For example, the organic solvent may be recycled back to an interfacial polycarbonate synthesis. The residual solvent in the polymer resin being isolated may be removed by known techniques, such as steam stripping.

The removal of the organic solvent from the liquid-liquid dispersion is, in one aspect of the invention, effected by introducing the liquid-liquid dispersion into an agitation tank filled with water at a temperature above the boiling point of the organic solvent for a time sufficient to evaporate the organic solvent. The agitation tank is fitted with an impeller to stir the mixture. The time for evaporation may be adjusted depending on the desired characteristics of the product. The present process further has the advantage that the agitation speed during the solvent removal step is substantially reduced compared to known processes, thereby requiring less energy expenditure.

A feed stream containing the liquid-liquid dispersion is preferably introduced into the agitation tank at the bottom of the tank, with care taken such that the liquid-liquid dispersion is introduced in a mixing zone. The type of impeller used in the agitation tank is an important consideration in producing product polymer having the desired characteristics. It is preferable to use axial flow impellers. In one embodiment, 45 degree pitched blade impeller is used. Other suitable impellers include, but are not limited to low shear hydrofoils and propellers.

The mechanical energy input through agitation into the vessel, for example the agitation tank, should be maintained such that enough turbulence is supplied to facilitate solvent removal and such that undesirable agglomeration of the particles is avoided. Typically, from 0.5 kilowatts per $m^3$ to about 4 kilowatts per $m^3$, more preferably about 2 kilowatts per $m^3$ produces product having the desired characteristics.

In the present process for recovering polymer, a small amount of the polymer to be isolated may optionally be added to the vessel containing the water or other heat removal liquid prior to the introduction of the liquid-liquid dispersion into the vessel used for removing solvent, for example the agitation tank fitted with an impeller. The polymer is added in solid form to "seed" the recovery of the polycarbonate. Typically from about 0.01 to about 25% by weight, more preferably about 1% by weight, based on the total weight of the total weight of the fluid in the vessel, such as an agitation tank, may be added to seed the process. In one embodiment, the seed particles are in the range of from about 1 to about 100 microns.

Removal of the organic solvent results in solid particles of polymer in an aqueous phase, herein referred to as a "slurry". The polymer particles formed typically have a size between 100 microns and 5 millimeters. The particles are typically agglomerations of smaller particles having an average size of from about 1 microns to about 100 microns, the smaller particles having glassy textures. By "glassy textures" it is meant that the particles have few pores in the bulk and appear to have a smooth texture. The polymer particles are preferably removed from the top of the tank by overflow of the slurry or a stream removed from the top of the tank.

Recovery of the polymer from the aqueous solution may be made by known liquid-solid separation processes, including, but not limited to, centrifugation, filtration, or decantation. The recovery of the solid particles is typically made at the top of the vessel. If the process is operated as a continuous process, for instance, the product overflow may be recovered from the top of the tank. The slurry solid content is preferably up to about 25%. As mentioned, the recovered polymer, such as polycarbonate, may be subjected to further purification techniques to remove residual solvent, for example steam stripping.

In the process of the instant invention, the coalescence of liquid droplets and the agglomeration of polymer/organic solvent gel particles, as well as the evaporation of the organic solvent are controlled by maintaining the process parameters, such as the temperature of the aqueous solution, the flow rate of the reaction mixture, the phase ratio between the reaction solution and the aqueous solution, and the shear rate used in forming the liquid-liquid dispersion through, for example, the rotor stator shear mixer. Suitable operating temperatures of the present process for the treatment of polycarbonate prepared by the interfacial process are in the range of about 40 to about 99° C.; more preferably about 40 to about 80° C.; even more preferably about 47 to about 55° C. at ambient pressure. The residence time in the vessel in which evaporation is effected is preferably at least about 20 minutes. These parameters may be varied depending on the type of polymer and the solvent being removed.

The operating temperature of the solvent removal step is preferably lower than the boiling point of the aqueous solution, and higher than the boiling point of the organic solvent. The texture of the particles may be manipulated by adjusting the differences between the boiling point of the organic solvent and the operating temperature of the process. In particular, the lower the differences between the boiling point of the organic solvent and the operating temperature of the process, the higher the bulk density of the product. For instance, at a temperature difference of about 7 degrees Celsius, the bulk density of the product polycarbonate is about 0.5 grams/cm$^3$. Conversely, the higher the differences between the boiling point of the organic solvent and the operating temperature of the process, the lower the bulk density of the product. For instance, at a temperature difference of about 28 degrees Celsius, the bulk density of the product polycarbonate is about 0.3 grams/cm$^3$. For the recovery of polycarbonate from methylene chloride having a bulk density of from about 0.5 grams/cm$^3$ to about 0.3 grams/cm$^3$ for instance, the operating temperature of the process is in the range of about 45 to 60 degrees Celsius, preferably 45 to 52 degrees Celsius.

The molecular weight of the product polymer recovered in the present process depends on the particular polymer being recovered. For BPA polycarbonate, the number average molecular weight of the product polycarbonate is in the range of about 10,000, with typical polydispersities in the range of about 2.5. The particles produced by the present process produce a high degree of spherical particle agglomeration.

The process of the invention may be operated in a semi-batch or a continuous manner.

FIG. 1 sets forth one embodiment of the invention. In FIG. 1, a jacketed agitation tank is fitted with an impeller 2. An annuli 3 is provided, wherein an aqueous stream 4 is passed through the outside and a polycarbonate solution stream 5 is passed through the inside. A rotor stator mixer 6 is provided. The solution stream and the aqueous stream are mixed at the center of the shear mixer where the applied shear produces a liquid-liquid dispersion having the aqueous phase as the continuous phase. The emulsion is sent to the agitation tank through line 7, and the injection point is provided close to the impeller. The heating media in the jacket of the agitation tank 1 provides the heat for the solvent evaporation, generating a slurry stream 8 containing polycarbonate particles. The slurry stream 8 containing the polycarbonate particles is overflowed from the top of the agitation tank. The solvent vapor 9 is released from the top of the agitation tank 1 for condensation.

EXAMPLES

The following examples are set forth to provide those of ordinary skill in the art with a complete description of how the compositions of matter and methods claimed herein are made and evaluated, and are not intended to limit the scope of what the inventors regard as their invention. Efforts have been made to insure accuracy with respect to numbers (e.g., amounts, temperature, etc.) but some errors and deviations should be accounted for. Unless indicated otherwise, parts are by weight, temperature is in ° C.

Molecular weights are reported as number average ($M_n$) and were determined by GPC analysis, using a polystyrene standard, of polycarbonate prepared by interfacial polymerization. Standards of polystyrene were used to construct a universal calibration against which polycarbonate could be measured using the Mark-Houwink equation. The temperature of the columns was 25° C. and the mobile phase was chloroform.

Examples 1 through 8

The equipment set-up for Examples 1 through 10 is set forth in FIG. 1. Examples 1 through 10 were performed as semi-batch processes. To effectively control the size of the solution droplets formed, the solution stream and water stream did not make contact before they reached the center of the stator in the mixer. This was achieved by introducing both streams into the shear mixer using an annuli with the solution stream and the water stream on each side. In Examples 1 through 10, the polycarbonate from a product mixture obtained in an interfacial polycarbonate synthesis using a methylene chloride solvent and containing 25% by weight of dissolved polycarbonate was isolated. The rotor-stator shear mixer used was Model 150L from Silverson Machines, Inc. The agitation tank used had an effective volume of 5.5 L with an inside diameter of 5.5 inch. The tank was jacketed and hot water was circulated to provide the heat for solvent evaporation. The solution was introduced close to the bottom of the agitation tank, in a mixing zone.

At the beginning of the experiment, the agitation tank was primed by filling the agitation tank with water. The temperature of the agitation tank was increased to the desired level of 55 to 60° C. 1 gram of BPA polycarbonate powder was added to the agitation tank as "seed". A 3 inch 45° pitched-blade impeller was used in the agitation tank with a rotation speed of 800 rpm. After the conditions reached equilibrium, the water and product solution stream were pumped through the rotor stator mixer for a period of 20 min. After about 20 minutes, the feed of product solution and water stream was stopped, and the mixture in the agitation tank was held at maximum bath temperature, which translates to a temperature of between 55 to 60° C. in the tank for about 15 minutes.

Next, the agitator was stopped and the solid-water mixture from the agitation tank was dumped into a vacuum filter to quickly remove the water. Samples of the product granules were taken to measure the water content as well as dichloromethane concentration. The particles were ground using a fitz-mill and the obtained powder was dried in the vacuum for 2 days before the bulk density is measured.

Example 9

The equipment set up for example 11 is the same as set forth above. Example 11 was operated as a continuous process. 1 gram of BPA polycarbonate powder was added to the agitation tank as "seed" and the water temperature of the tank was set as 47° C. The run started with a solution flow rate through the rotor stator mixer of 20 ml/minute, and the polycarbonate concentration in the solution was 25%, by weight. The rotor stator mixer was operated at 1700 rpm. In the agitation tank, the impeller was a 45° pitched blade with a diameter of 3 inches and rotated at a speed of 800 rpm. The volumetric ratio of the water phase to the organic phase was 15.

After 10 minutes, the solution flow rate was increased to 40 ml/minute, and the volumetric ratio between the water phase and the organic phase was 5. The run lasted for 1 hour and 40 minutes, with the resin particles obtained from overflow from the top of the agitation tank. The solid content in the slurry was measured at 25%.

"Flow rate" is the flow rate through the rotor stator mixer.

"Water content" is the weight fraction of water based on the weight of the slurry.

"MeCl2 conc." is the weight fraction of methylene chloride in the product granules, based on the total weight of the granules.

TABLE I

The polycarbonate from Examples 3 and 6 were further subjected to steam stripping at a temperature of 106° C. After 80 minutes, the methylene chloride content was less than 25 ppm. The stripping test was performed as follows: The

| Experiment | Spd of R_S(rpm) | Temp(C.) | W/O Ratio | Flow Rate(ml/min) | Bulk Density (g/mL) | Water Content | MeCl2 conc. |
|---|---|---|---|---|---|---|---|
| 1 | 1700 | 47 | 15 | 20 | 0.341 | 0.423 | 0.0460 |
| 2 | 1700 | 52 | 5 | 20 | 0.309 | 0.465 | 0.0510 |
| 3 | 1700 | 52 | 15 | 10 | 0.135 | 0.674 | 0.0295 |
| 4 | 1700 | 47 | 5 | 10 | 0.214 | 0.487 | 0.0221 |
| 5 | 3400 | 52 | 5 | 10 | 0.092 | 0.696 | 0.0552 |
| 6 | 3400 | 47 | 15 | 10 | 0.236 | 0.497 | 0.0408 |
| 7 | 3400 | 52 | 15 | 20 | 0.291 | 0.338 | 0.0238 |
| 8 | 3400 | 47 | 5 | 20 | 0.424 | 0.288 | 0.0568 |
| 9 | 1700 | 47 | 5 | 40 | 0.447 | 0.251 | NA |
| 10 | 1700 | 47 | 1 | 60 | 0.491 | 0.264 | 0.0238 |

Example 10

The equipment set up for Example 12 is the same as set forth above. The equipment set up for example 12 is the same as set forth above. Example 12 was operated as a continuous process. 1 gram of BPA polycarbonate powder was added to the agitation tank as "seed" and the water temperature of the agitation tank was set as 47° C. The run started with a solution flow rate through the rotor stator mixer of 20 ml/minute, and the polycarbonate concentration in the solution was 25%, by weight. The rotor stator mixer was operated at 1700 rpm. In the agitation tank, the impeller was a 45° pitched blade with a diameter of 3 inches and rotated at a speed of 800 rpm. The volumetric ratio of the water phase to the organic phase was 15.

After 10 minutes, the solution flow rate was increased to 40 ml/minute, and the volumetric ratio between the water phase and the organic phase was 5. After 10 minutes of operation at such conditions, the solution flow rate was increased to 60 ml/minute with the volumetric flow rate between the water and the organic phase as 1. The run lasted for 1 hour and 10 minutes, with the resin particles obtained from overflow from the top of the agitation tank. During this period of time, rotation of the impeller was maintained at 600 rpm. The water in the slurry was removed by centrifugal force. The water content in the resultant mixture was 10% of the total weight of the resultant mixture.

In the examples above, the tip speed of the impeller was kept at 3 meters/sec except for Example 11, in which the agitation speed was reduced to 2.3 m/sec after the start up. The process parameters that were varied in Examples 1 through 11 were: 1) the rotation speed of rotor in shear mixer, 2) the flow rate of polymer solution, 3) the phase ratio between polymer solution and water. The process conditions and properties results are listed in the Table 1.

"Speed of R_S" is the speed of the rotor stator mixer in rotations per minute.

"W/O Ratio" is the volumetric ratio of the water phase to the organic phase.

ground powder obtained from the homogenization isolation was formed in a fixed bed in a glass column where saturated 5 psig steam was passed through the bed. The solvent level in the powder is measured at 80 minutes. The steam flow rate is significantly larger than the total solvent contained in the powder, so that at any moment, steam that is contacted with powders can be considered as solvent free.

The invention has been described in detail with particular reference to preferred embodiments thereof, but it will be understood that variations and modification can be effected within the scope of the invention.

What is claimed is:

1. A method of recovering polycarbonate from an organic mixture comprising polycarbonate and an organic solvent, the method comprising:
   a) admixing an aqueous solution and the organic mixture by the application of a combined mechanical and hydraulic shear force, the combined mechanical and hydraulic shear force being sufficient to form a liquid-liquid dispersion;
   b) removing the organic solvent from the liquid-liquid dispersion thereby forming a slurry; and
   c) separating the polycarbonate from the slurry.

2. The method of claim 1, wherein the ratio of the aqueous solution to the organic solvent is from 15:1 to 1:1 by volume.

3. The method of claim 1, wherein the organic solvent is dichloromethane.

4. The method of claim 1, wherein step c) comprises evaporating the organic solvent from the liquid-liquid dispersion.

5. The method of claim 1, wherein the organic mixture comprises from about 5 to about 35% by weight of polycarbonate.

6. The method of claim 1, wherein the liquid-liquid dispersion comprises droplets having diameters up to about 200 microns.

7. The method of claim 1, wherein the liquid-liquid dispersion comprises droplets having diameters up to about 50 microns.

8. The method of claim 1, wherein the liquid-liquid dispersion consists essentially of droplets having diameters up to about 50 microns.

9. The method of claim 1, wherein the shear force is effected by a rotor stator mixer operating at a shear rate of from about $5\times10^4$/second to about $7\times10^5$/second.

10. A method of recovering a polymer from an organic mixture comprising polymer and an organic solvent, the method comprising:
 a) admixing an aqueous solution and the organic mixture by the application of a combined mechanical and hydraulic shear force, the combined mechanical and shear force being sufficient to form a liquid-liquid dispersion;
 b) removing the organic solvent from the liquid-liquid dispersion thereby forming a remaining solution; and
 c) separating the polymer from the remaining solution.

11. A method of recovering polycarbonate from an organic mixture comprising polycarbonate and methylene chloride, the organic mixture being the product of an interfacial polycarbonate synthesis the method comprising:
 a) admixing water and the organic mixture by the application of a combined mechanical and hydraulic shear force, the combined mechanical and hydraulic shear force being sufficient to form a liquid-liquid dispersion, the liquid-liquid dispersion comprising droplets having a diameter of from about 1 to about 300 microns;
 b) removing the methylene chloride from the liquid-liquid dispersion thereby forming a slurry comprising solid polycarbonate particles; and
 c) separating the polycarbonate from the slurry.

12. The method of claim 11, wherein the diameter of the droplets is from about 1 micron to about 50 microns.

13. The method of claim 11, wherein the combined mechanical and hydraulic shear force is effected by a rotor stator mixer operating at a shear rate of from about $5\times10^4$/second to about $7\times10^5$/second.

14. The method of claim 11, wherein the step of removing the methylene chloride comprises introducing the liquid-liquid dispersion into an agitation tank filled with water, wherein the temperature of the water is higher than the boiling point of methylene chloride.

15. A method of recovering polycarbonate from an organic mixture comprising polycarbonate and methylene chloride, the organic mixture being the product of an interfacial polycarbonate synthesis the method comprising:
 a) admixing water and the organic mixture by the application of a combined mechanical and hydraulic shear force, the combined mechanical and hydraulic shear force being sufficient to form a liquid-liquid dispersion, the liquid-liquid dispersion comprising droplets having a diameter of from about 1 to about 300 microns; and
 b) removing the methylene chloride from the liquid-liquid dispersion thereby forming a slurry comprising solid polycarbonate particles.

16. A method of recovering polycarbonate from an organic mixture comprising polycarbonate and methylene chloride, the organic mixture being the product of an interfacial polycarbonate synthesis, the method comprising:
 a) admixing water and the organic mixture by the application of a combined mechanical and hydraulic shear force, the combined mechanical and hydraulic shear force being sufficient to form a liquid-liquid dispersion, the liquid-liquid dispersion comprising droplets having a diameter of from about 1 to about 300 microns;
 b) introducing the liquid-liquid dispersion into a mixing zone of an agitation tank having a top and a bottom, the agitation tank containing water held at a temperature higher than the boiling point of methylene chloride but lower than the boiling point of water, the liquid-liquid dispersion in the agitation tank being held for a residence time sufficient to remove at least 80% by weight of the methylene chloride, thereby forming a slurry comprising solid polycarbonate particles; and
 c) separating the polycarbonate from the slurry.

17. The method of claim 16, wherein the slurry comprising solid polycarbonate particles is removed in an overflow stream from the top of the tank, and wherein the liquid-liquid dispersion is introduced at the bottom of the tank, in the mixing zone.

18. The method of claim 16, wherein the diameter of the droplets of the liquid-liquid dispersion is from about 1 to about 50 microns.

19. The method of claim 16, wherein the shear force is effected by a rotor stator mixer operating at a shear rate of from about $5\times10^4$/second to about $7\times10^5$/second.

20. The method of claim 16, further comprising the step of adding from about 0.01 to about 25% by weight of polycarbonate in solid form into the agitation tank, based on the total weight of the fluid in the vessel, wherein the polycarbonate in solid form is added prior to the introduction of the liquid-liquid dispersion into the agitation tank.

21. A method of recovering polycarbonate from an organic mixture comprising polycarbonate and methylene chloride, the organic mixture being the product of an interfacial polycarbonate synthesis, the method comprising:
 a) admixing water and the organic mixture by the application of a combined mechanical and hydraulic shear force, the combined mechanical and hydraulic shear force being sufficient to form a liquid-liquid dispersion, the liquid-liquid dispersion comprising droplets having a diameter of from about 1 to about 50 microns;
 b) introducing the liquid-liquid dispersion into an agitation tank fitted with an impeller, the agitation tank having a top and a bottom, the liquid-liquid dispersion being introduced directly into the bottom of the agitation tank and below the impeller, the liquid-liquid dispersion further being introduced into a mixing zone, the agitation tank containing water held at a temperature higher than the boiling point of methylene chloride but lower than the boiling point of water; and
 c) maintaining a residence time of the liquid-liquid dispersion in the agitation tank for a period sufficient to remove at least 80% by weight of the methylene chloride, thereby forming a slurry comprising solid polycarbonate particles.

22. The method of claim 21 further comprising the step of removing the slurry from the top of the tank.

23. The method of claim 22, further comprising the step of removing the solid polycarbonate from the slurry.

24. The method of claim 21 wherein the combined mechanical and hydraulic shear force is effected by a rotor stator mixer operating at a shear rate of from about $5\times10^4$/second to about $7\times10^5$/second.

25. The method of claim 21, wherein the impeller in the agitation tank is an axial impeller.

26. The method of claim 21, wherein the ratio of the water that is admixed with the organic solvent is from 15:1 to 1:1 by volume.

27. The method of claim 21, further comprising the step of adding from about 0.01 to about 25% by weight of polycarbonate in solid form into the agitation tank, based on the total weight of the fluid in the agitation tank, wherein the polycarbonate in solid form is added prior to the introduction of the liquid-liquid dispersion into the agitation tank.

* * * * *